United States Patent
Harman et al.

[11] 3,821,844
[45] July 2, 1974

[54] LATHES WITH AUTOMATIC TOOL CHANGE FACILITIES

[75] Inventors: Julius Harman, Baginton; Michael Eric Norman, Hinckley, both of England

[73] Assignee: Alfred Herbert Limited, Coventry, England

[22] Filed: Oct. 9, 1970

[21] Appl. No.: 79,617

[30] Foreign Application Priority Data
Oct. 9, 1969   Great Britain .................. 49569/69

[52] U.S. Cl. .................................................. 29/568
[51] Int. Cl. .............................................. B23q 3/157
[58] Field of Search ............... 29/568, 26; 279/1 TS

[56] References Cited
UNITED STATES PATENTS

| | | | |
|---|---|---|---|
| 3,242,771 | 3/1966 | Maier et al. ........................ | 74/826 |
| 3,466,739 | 9/1969 | Harman ............................. | 29/568 |
| 3,513,734 | 5/1970 | Burroughs et al. ................ | 74/826 X |
| 3,584,374 | 6/1971 | Spuhler ............................. | 29/568 |
| 3,667,114 | 6/1972 | Smith et al. ....................... | 29/568 |

*Primary Examiner*—Andrew R. Juhasz
*Assistant Examiner*—Z. R. Bilinsky
*Attorney, Agent, or Firm*—Holman & Stern

[57] ABSTRACT

In a tool change lathe, tools are located on a slide structure by means of inter-meshing toothed locating rings. A piston incorporated in the tool mount is interlockingly engageable with a tool and draws the tool onto the tool mount to interengage the toothed locating rings. The piston is rotatable about its axis so that the tool can be indexed to anyone of a plurality of different positions before the toothed locating rings are interengaged.

16 Claims, 8 Drawing Figures

3,821,844

LATHES WITH AUTOMATIC TOOL CHANGE FACILITIES

BACKGROUND OF THE INVENTION

This invention relates to lathes with automatic tool change facilities. It is an object of the invention to provide such a lathe in a convenient form.

SUMMARY OF THE INVENTION

A lathe in accordance with the invention comprises a frame, a spindle on said frame, a slide structure on said frame, tool mount means on said slide structure for carrying tools for operating on a workpiece carried on the spindle and tool transfer means for transferring selected tools from a magazine to the tool mount means and vice versa, characterised in that said tool mount means includes a toothed locating device arranged with its axis perpendicular to the spindle axis and means for drawing a complementary toothed locating device on a tool into engagement with the toothed locating device of the tool mount means, and in that the tool can be indexed to any one of a plurality of different positions before its toothed locating device is interengaged with the toothed locating device of the tool mount means.

In the accompanying drawings:

BRIEF DESCRIPTION OF THE DRAWINGS

FIGS. 6 and 7 are views on arrows 6 and 7 in FIG. 5; and

DETAILED DESCRIPTION OF THE INVENTION

Figure 1:
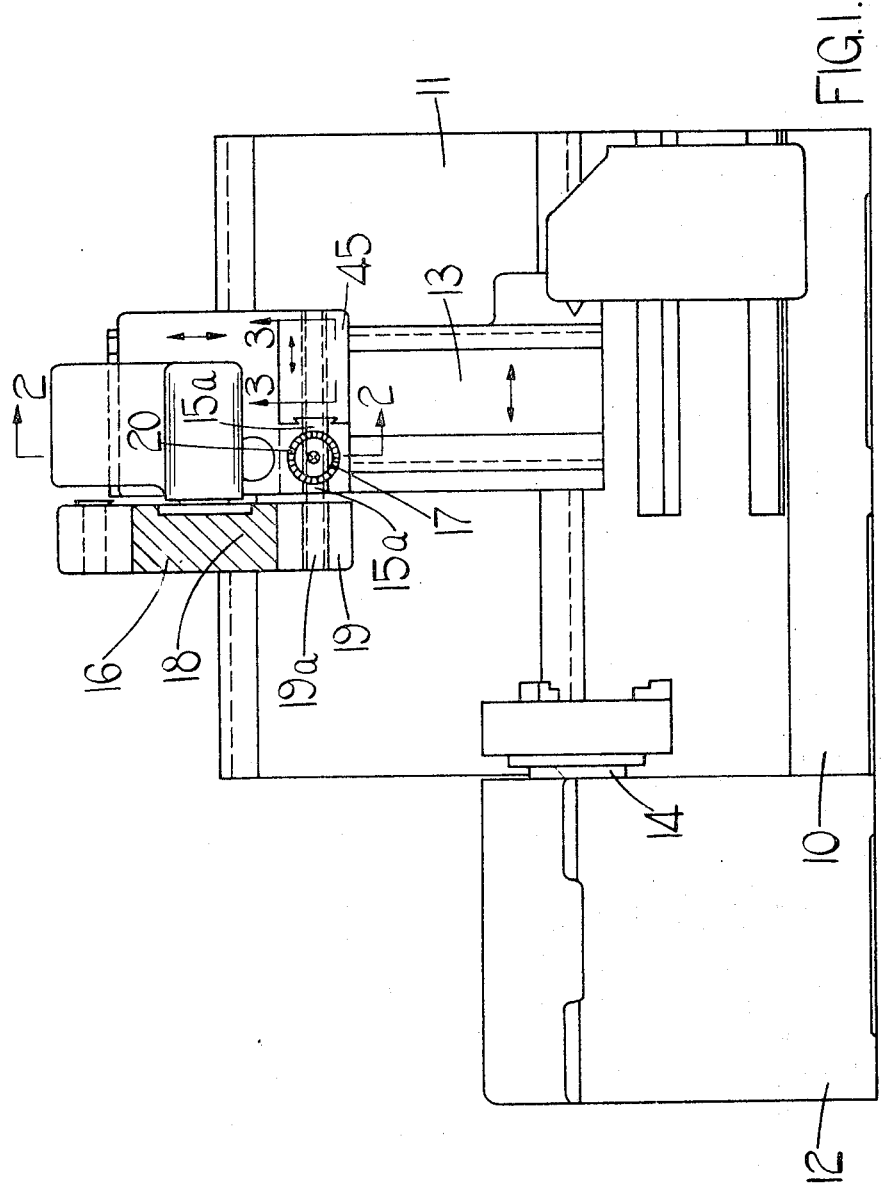
FIG. 1 is a diagrammatic elevation of a lathe to which an example of the invention is applied.
Figure 2:
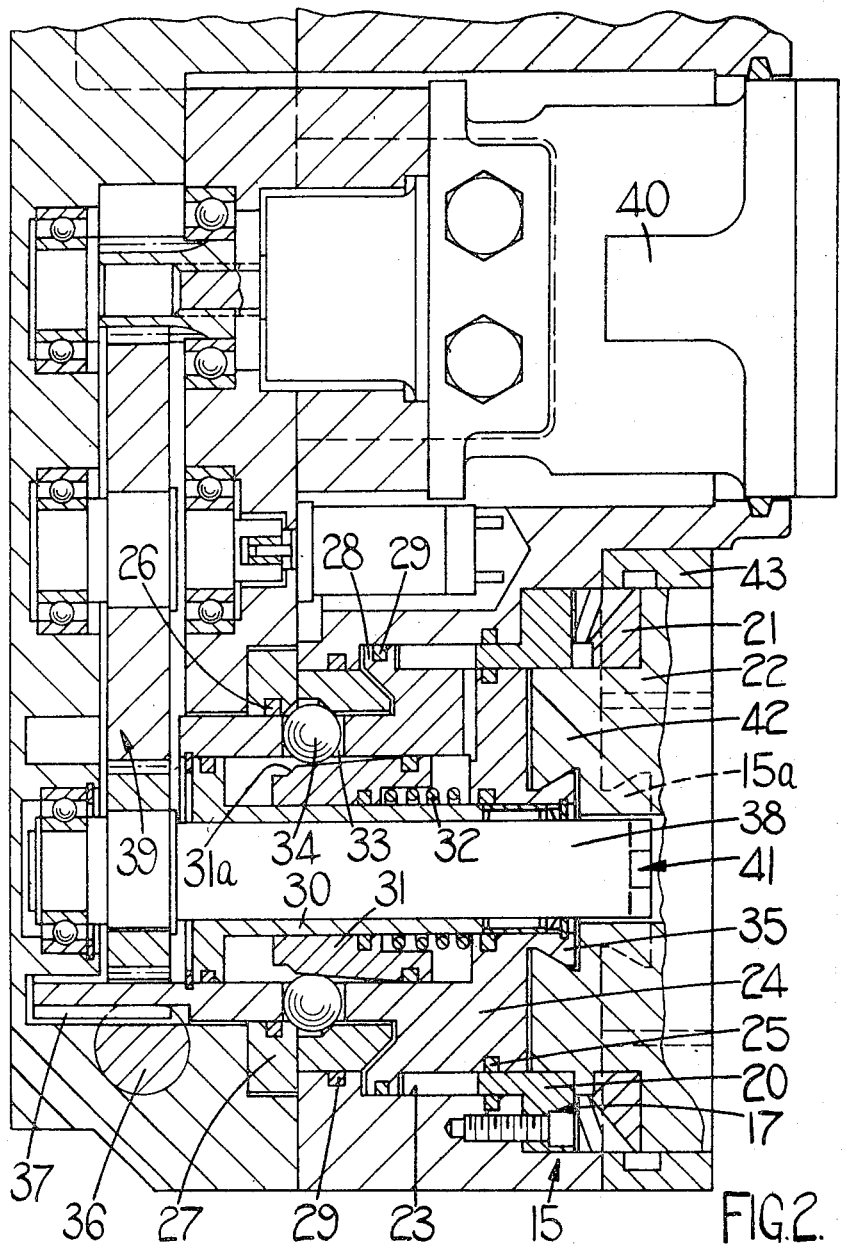
FIG. 2 is an enlarged fragmentary sectional view on line 2—2 in FIG. 1.
Figure 3:
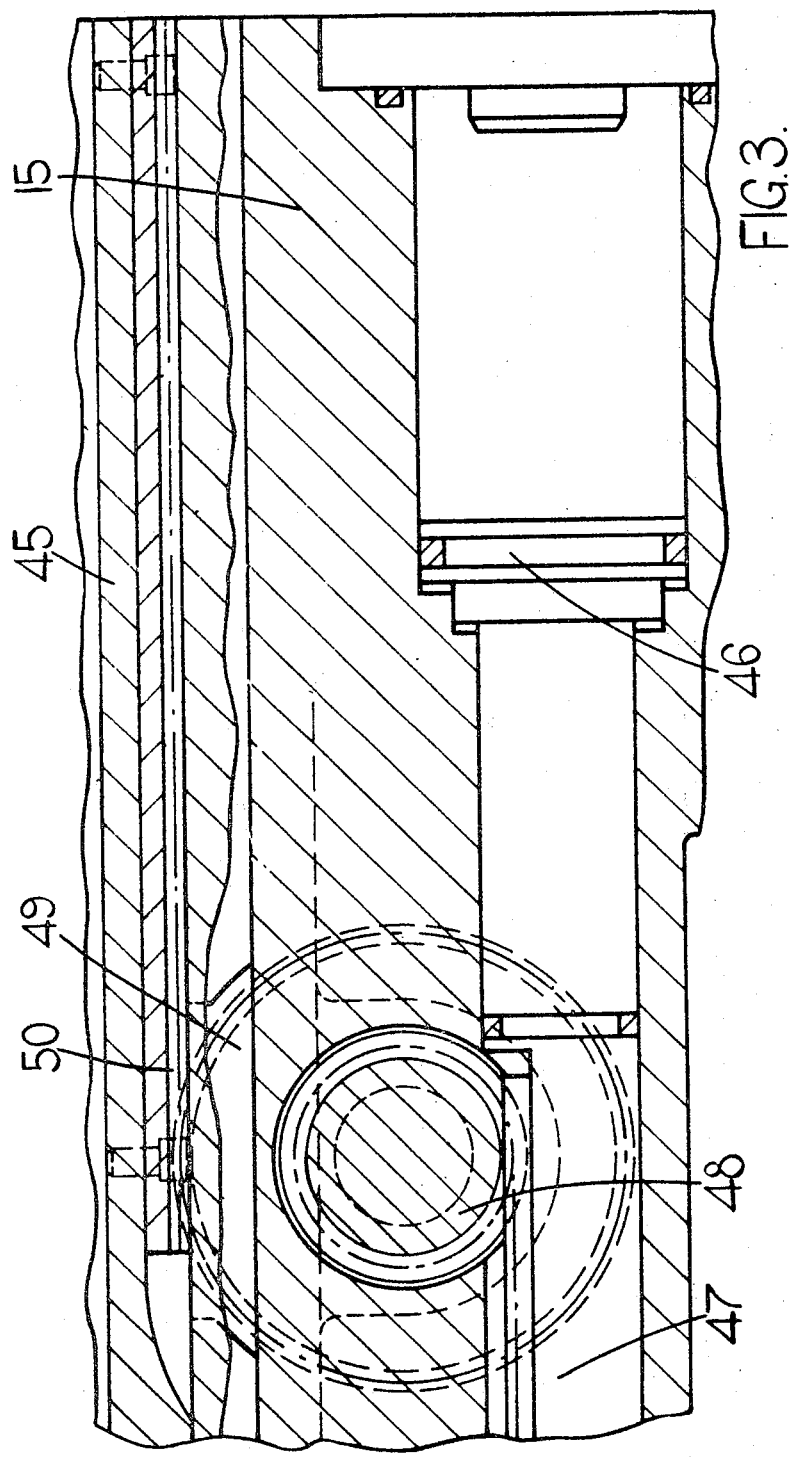
FIG. 3 is an enlarged fragmentary section on line 3—3 in FIG. 1.
Figure 4:
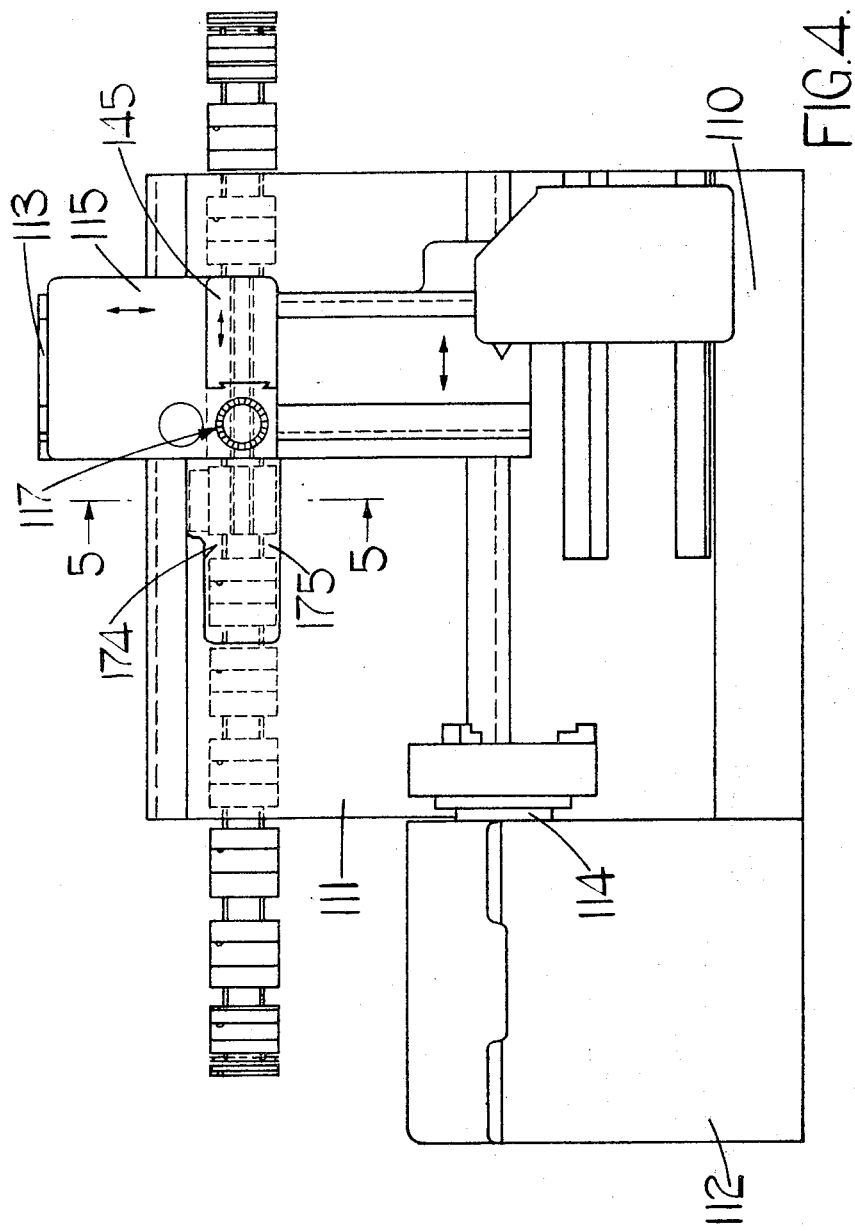
FIG. 4 is a diagrammatic elevation of a different lathe to which another example of the invention is applied.

Referring firstly to FIGS. 1 to 3, the lathe shown includes a frame made up of a plurality of sections attached together by bolts or in any other convenient way. Choice of appropriate sections from a range of sections enables lathes of widely differing geometries to be made up relatively simple.

In the present case there are a base 10 and a bed 11 of appropriate lengths, a headstock 12 fixed to the base 10, a saddle 13 slidable horizontally along the bed in a direction parallel to the axis of the headstock spindle 14, and a slide 15 vertically movable on the saddle 13. A tool magazine 16 is mounted on the saddle 13 and carries a plurality of tools (not shown) for transfer to a tool mount 17 on the slide 15.

The magazine 16 comprises a disc member 18 mounted for rotation on an axis spaced from and parallel to the spindle axis and a plurality of tool carrying devices 19 arranged around the periphery of the disc. Each tool-carrying device 19 has a track section 19a, of dovetail shape in cross-section, extending in a direction parallel to the spindle axis.

The slide 15 likewise has a track section 15a of similar shape extending across its face and, by movement of the slide to an appropriate position the two track sections 15a, 19a can be aligned to form a substantially continuous track of dovetail section.

Turning to FIG. 2 the tool mount means 17 on the slide 15 includes a toothed locating device in the form of a ring 20 formed with teeth in one face. This ring can coact with a complementary ring 21 which is provided on the end 22 of each tool used in the machine. The ring 20 is fitted in the open end of a bore 23 in slide 15 and slidable in this bore is a piston 24 of stepped annular form. One end of the piston 24 has a seal ring 25 sliding in the ring 20 and the other end, being of smaller diameter, slides through a sealing ring 26 mounted on a member 27 fixed in the bore 23. Intermediate its ends the piston has a flange 28 with a seal ring 29 sliding in the bore 23.

A tubular sleeve 30 extends through the interior of the piston 24 and a locking ring 31 is slidably mounted in an annular section space formed between the interior of the piston 24 and the exterior of the sleeve 30. The ring 31 is externally frusto-conically tapered in a direction towards the end of the piston 24 sliding in the sealing ring 26. At the smaller end of the ring 31 there is a steep frusto-conical shoulder 31a. A spring 32 urges the ring 31 in the direction of its taper.

The portion of the piston 24 between the sealing ring 26 and the flange 28 is formed with a series of radial bores 33 in which steel balls 34 are disposed. The diameter of each ball 34 is greater than the thickness of the wall of the piston. The member 27 is formed with an internal groove which receives the balls 34 as shown when the piston is retracted into the bore 23. The spring 32 urges the ring 31 to a position such that the relatively shallowly tapered portion of its surface engages the balls and thrusts these outwardly to lock the piston firmly in its retracted position.

When it is required to move the piston out of its retracted position fluid under pressure is introduced into the bore through a port (not shown) in the member 27. Pressure then acts on the ring 31 since fluid can pass through the bores 33 and displaces the ring 31 against its spring loading. It is to be noted that there is a drilling through the piston 24 between the end thereof adjacent the seal ring 25 and its interior at the larger end of ring 31. Displacement of the ring 31 permits the inward movement of the balls 34 which must accompany displacement of the piston 24 resulting from the application of fluid pressure to the flange 28 of the piston.

The end of the piston opposite the seal ring 26 is formed across its face with a dovetail track portion 35 of the same section as the track portions 15a and 19a. When the piston 24 is at the end of its stroke opposite the retracted position shown in FIG. 1 the dovetail track portion 35 is aligned with dovetail track section 15a.

The piston 24 is rotatable about its axis by a rack 36 engaging elongated pinion teeth 37 formed on an extension of the piston 24. The arrangement is such that a hydraulic piston and cylinder unit (not shown) which drives the rack 36 can turn the piston through 90° between a position in which the dovetail track section 35 is orientated for alignment with the dovetail track section 15a and a position in which the section 35 is oriented at right angles to its other position.

lised are substantially identical to those used in the first described embodiment, i.e., each has a dovetail groove which is engaged with the dovetail track on the trolley or the tool mount and each also has a dovetail at one end for engagement by the dovetail groove in the slider 145. A suitable locking device fastens the tool to the trolley and similar locking devices are provided for locking the trolleys to the track sections 170 and 171.

The front web of the bed has a window 174 which has a shutter 175 (not shown in FIG. 5) which can be opened and closed by a suitable actuator.

Figure 5:
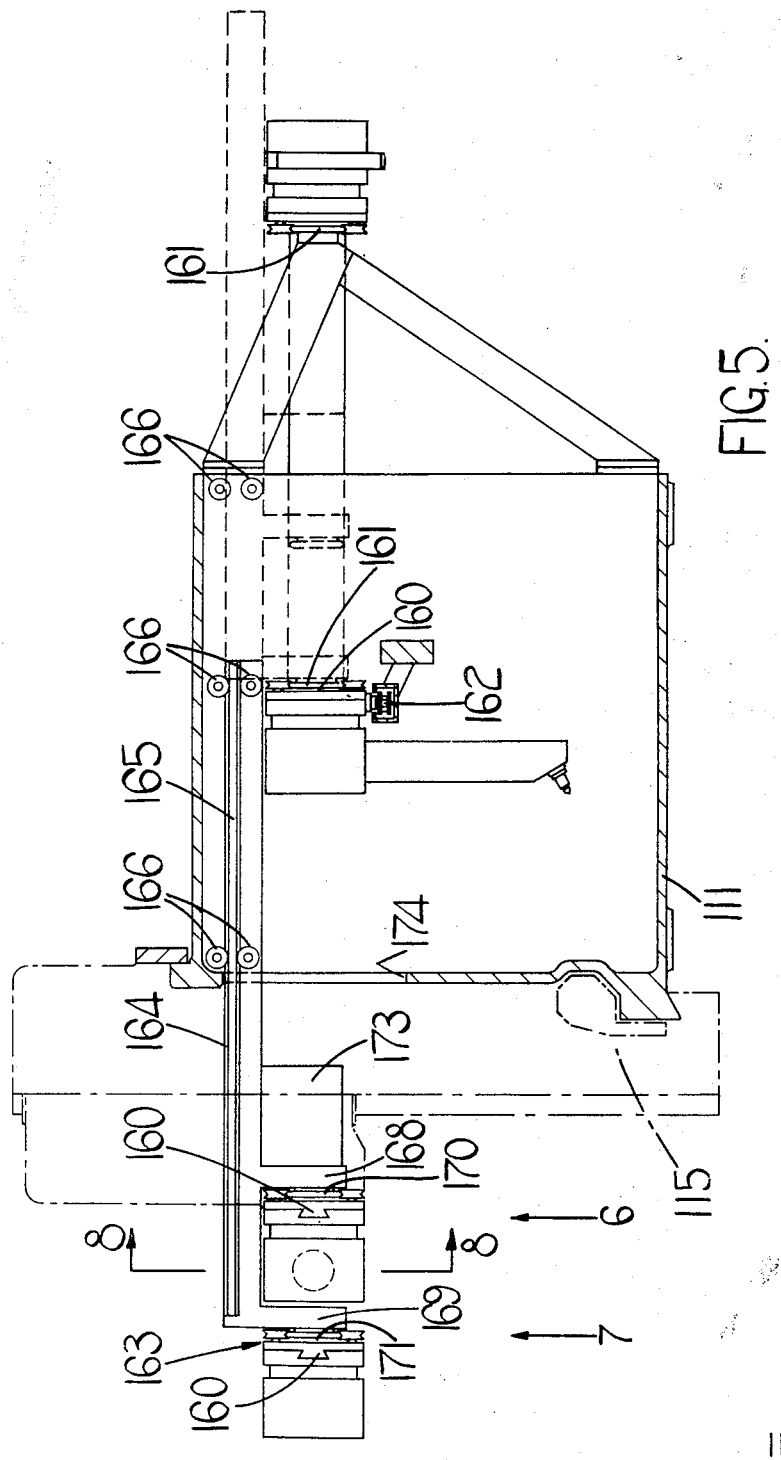
FIG. 5 is an enlarged fragmentary section on line 5—5 in FIG. 4.
Figure 6:
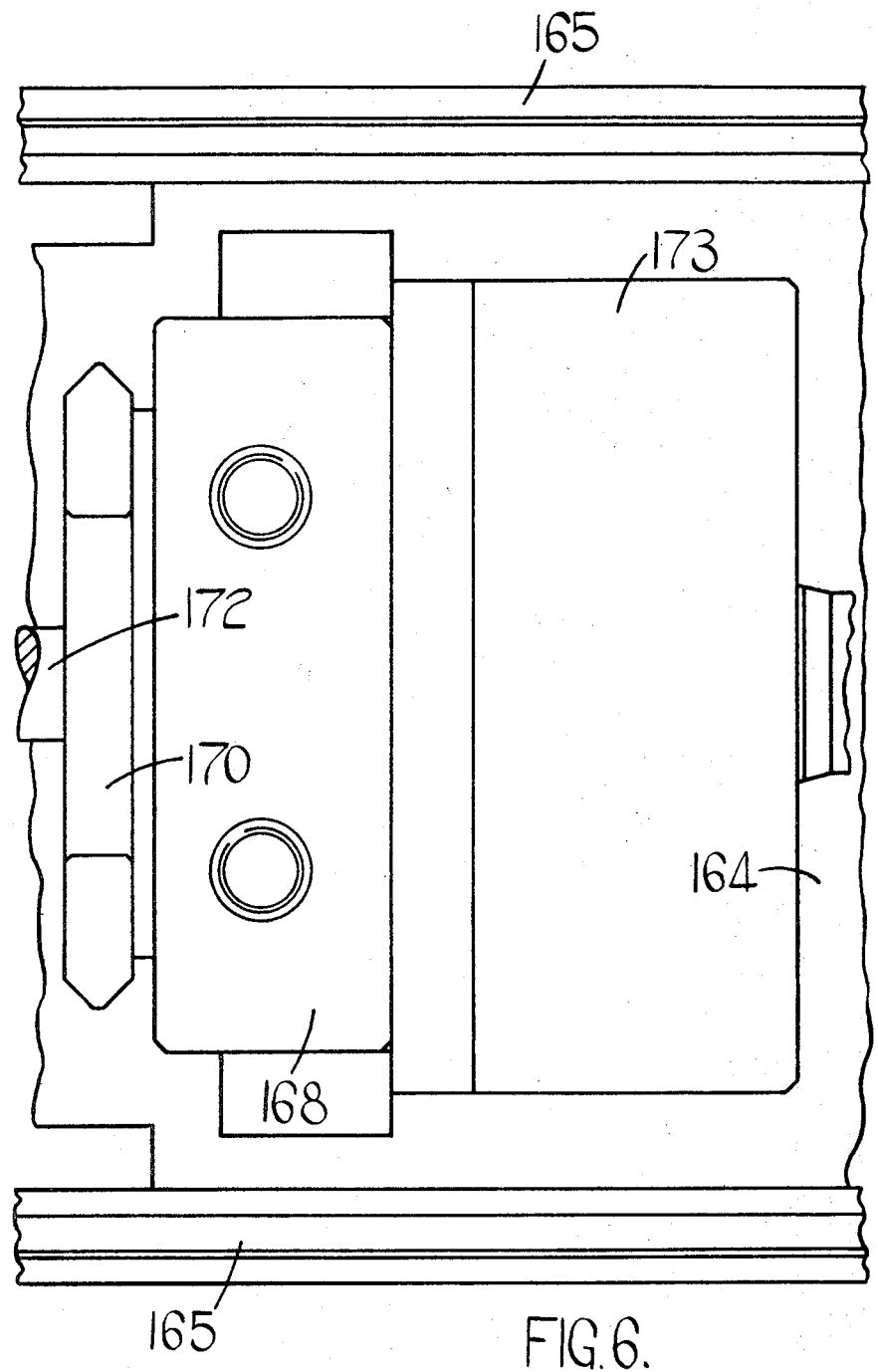
Figure 8:
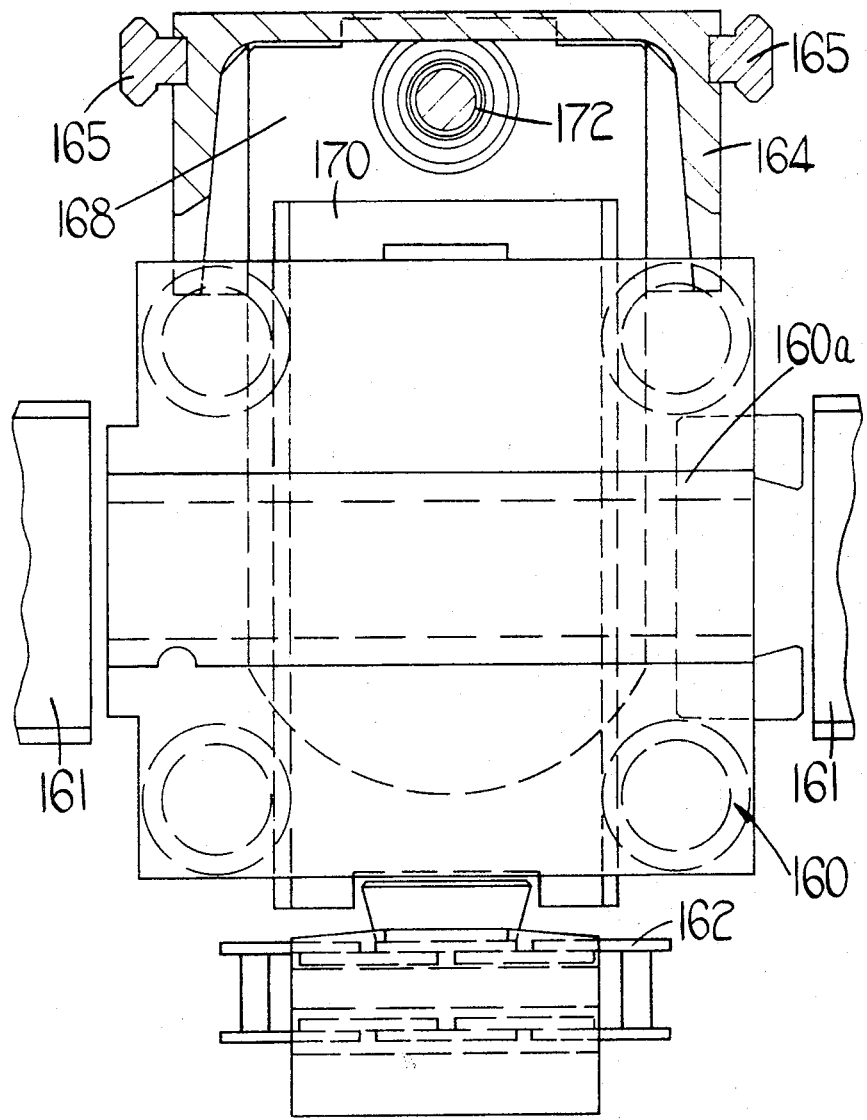
FIG. 8 is an enlarged section on line 8—8 in FIG. 5; the tools shown in FiG. 5 being omitted in FIGS. 6, 7 and 8.

The arrangement is such that any long tools stored in the magazine hang downwardly like the tool 176 shown in FIG. 5. The window 174, however, extends horizontally and it is therefore necessary to turn the trolley 160 on which the tool is stored before it can be moved through the window.

During tool selection one of the two rail sections 170, 171 is plated in the gap in the rail 161 and the chain 162 is driven until the next tool required is found and arrested on the rail section 170 or 171. The beam 164 is then advanced on rotation of the stop drum to a position such that the tool on the rail section 170 or 171 is clear of the remaining tools in the magazine. The two rail sections 170 and 171 are then turned through 90° and the mechanism then dwells in that position until the machining operation currently in progress is completed. When this operation is complete the saddle is moved to its appropriate tool exchange position and the shutter 175 of the window 174 is then opened. The stop drum is then indexed again and the beam moves forwardly to bring the one of the rail sections 170, 171 which carries the empty trolley belonging to the tool currently on the tool mount, into the tool transfer position.

The slide 115 is then moved vertically to the appropriate tool transfer position, after which the tool on the tool mount means is released and indexed through 90° if necessary. The tool on the tool mount means is then pushed on to the empty trolley by the slider 145 and the beam is then moved to bring the other of the rail sections 170 and 171 to the tool transfer position. The orientation and arrangement of the dovetails on the shrouds allows that on the tool just transferred to a trolley to be disengaged from the slider and that on the other trolley to become engaged with the slider 145 as a result of this movement. The slider is then moved back to its original position, thus transferring the new tool to the tool mount means. If required the piston of the tool mount means is now indexed and if no indexing is required the slide is moved vertically clear of the lug 169 before the tool is clamped and the beam 164 is withdrawn back into the bed 111. The beam is arrested at a position with the lug 168 or 169 now bearing a tool in front of the rail 161 and the rail sections 170, 171 are indexed before the beam completes its journey to align the rail section carrying the trolley with the used tool on it into alignment with the rail 164. Meanwhile the shutter 175 is closed and the new machining operation can commence.

The above described embodiment provides the same advantages as those mentioned in respect of the first described example, except that the tool transfer mechanism is rather more complex. This, is offset, however, by increased capacity for different tools.

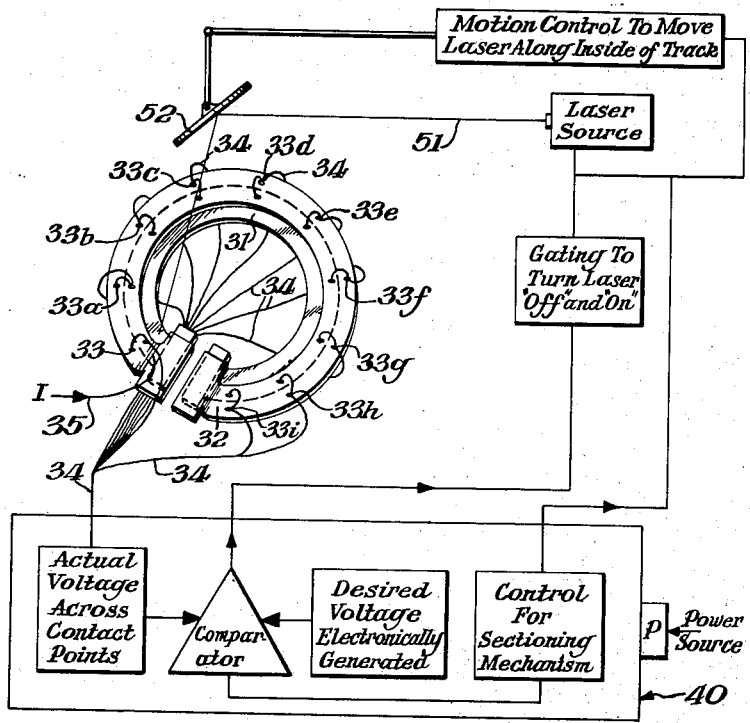

Having thus described our invention what we claim as new and desire to secure by Letters Patent is:

1. A lathe comprising a frame, a spindle on said frame, a slide structure on said frame, tool mount means on said slide structure for carrying tools for operating on a workpiece carried on the spindle and tool transfer means for transferring selected tools from a magazine to the tool mount means and vice-versa, said tool mount means including a toothed locating device arranged with its axis perpendicular to the spindle axis, a complementary toothed locating device on a tool, a piston movable by fluid pressure axially of said toothed locating device, means on said piston for non-rotatably engaging a tool transferred thereto by said tool transfer means, axial movement of the piston effecting drawing of the complementary toothed locating device on the tool into engagement with the toothed locating device of the tool mount means, and means for imparting rotation to said piston while said toothed locating devices are out of inter-engagement to permit indexing of the tool to any one of a plurality of different positions before its toothed locating device is inter-engaged with the toothed locating device of the tool mount means.

2. The lathe as claimed in claim 1 in which said toothed locating device of the tool mount means is a ring with teeth on one face thereof.

3. The lathe as claimed in claim 1 in which said means for non-rotatably engaging a tool comprises a dovetail rib across one end of the piston.

4. The lathe as claimed in claim 3 in which the piston is slidable in a cylinder into which pressurised fluid can be introduced on either side of the piston.

5. The lathe as claimed in claim 4 including a locking device on said piston actuable to lock the piston in a withdrawn position and releasable by fluid pressure introduced into said cylinder to move the piston out of its withdrawn position.

6. The lathe as claimed in claim 5 in which said locking device comprises a sleeve mounted in a bore in the piston, a locking ring having a frusto-conical cam surface slidable in the annular space between the piston and the sleeve, and a plurality of balls in cross-bores in the piston urged outwardly into a groove in the cylinder by a spring acting on said locking ring, said ring being displaceable against said spring by fluid pressure.

7. The lathe as claimed in claim 1 in which the piston has an extension formed with external teeth and a transversely movable toothed rack engaging said extension for turning the piston.

8. The lathe as claimed in claim 1 in which said magazine includes a plurality of tool carrying devices each having thereon a track section with which a tool having a portion of complementary section can be interlockingly engaged, said tool mount means having a corresponding track section alignable with the track section of a selected tool-carrying device, and said tool transfer means including a transfer member movable in a direction parallel to said alignable track sections and engageable with a tool.

9. The lathe as claimed in claim 8 in which said transfer member is provided with a further track arrangement extending substantially perpendicularly to the alignable track sections and interlockingly engageable with a further complementary portion of the tool.

10. The lathe as claimed in claim 8 in which said magazine comprises a disc carrying said tool-carrying devices and mounted on the machine tool for rotation to present a selected tool carrying device to a tool transfer location.

11. The lathe as claimed in claim 10 in which the track sections of all the tool-carrying devices are parallel to the rotary axis of said disc.

12. The lathe as claimed in claim 11 in which said slide structure comprises a saddle movable along a bed and a slide movable along a guideway on the saddle in a direction perpendicular to the direction in which the saddle is movable along the bed, the magazine being mounted on said saddle, and the tool mount means and the tool transfer means being mounted on the slide.

13. The lathe as claimed in claim 8 in which the magazine comprises a rail mounted on the frame and extending in a substantially closed path along which said tool carrying devices are movable, said tool transfer means including a rail section for completing said closed path and means for displacing said rail section to a tool transfer position for alignment of the track section on a tool-carrying device on said rail section with the track section of the tool mount means.

14. The lathe as claimed in claim 13 in which the tool transfer means comprises a pair of said rail sections in spaced parallel relationship movable between a position in which one rail section completes said rail, a position in which the other rail section completes the rail, a position in which said one rail section is at said tool transfer position and a position in which said other rail section is at said tool transfer position.

15. A lathe as claimed in claim 13 further comprising means for angularly moving said rail section about an axis parallel to the direction of movement of said rail section to and from said tool transfer position.

16. A lathe as claimed in claim 15 in which the rail extends behind a bed on which said slide structure is carried, said bed having a window through which said rail section is moved to and from the tool transfer position, said means for angularly moving said rail section being operative when the rail section occupies a position intermediate said window and the rail.

* * * * *

United States Patent [19]

Hukee et al.

[11] 3,821,845

[45] July 2, 1974

[54] METHOD OF MAKING A LINEAR FILM POTENTIOMETER HAVING A CIRCULAR CONFIGURATION

[75] Inventors: Vernon V. Hukee, Nashua, N.H.; William J. Travis, Ronse, Belgium

[73] Assignee: Sprague Electric Company, North Adams, Mass.

[22] Filed: June 29, 1972

[21] Appl. No.: 267,277

Related U.S. Application Data

[63] Continuation-in-part of Ser. No. 127,106, March 23, 1971, abandoned.

[52] U.S. Cl............................ 29/593, 29/620, 324/63
[51] Int. Cl............................ H01c 17/00, G01r 17/02
[58] Field of Search............... 29/593, 620; 338/195; 324/63

[56] References Cited
UNITED STATES PATENTS
3,211,031 10/1965 Martin ........................... 338/195 X
3,649,801 3/1972 Cardell .......................... 338/195 X Primary Examiner—Roy Lake
Assistant Examiner—James W. Davie
Attorney, Agent, or Firm—Connolly and Hutz

[57] ABSTRACT

Extreme linearity of a film potentiometer is instantaneously obtained by a computerized sectioning method. A circular film potentiometer track is sectioned off for the purposes of trimming the track, the number of sections being determined by the extent of linearity desired. A computerized contact point board programmed to produce a particular linearity for the circular track is then brought into contact with the track. On contact, current begins to flow through the resistance track producing a particular voltage at each sectionalized contact point area thereon. The voltage produced at each contact area, with reference to ground, is instantaneously compared to an electronically generated desired voltage. Every time the voltage across a particular section varies below the standard or desired comparison voltage, a laser beam cuts radially into the potentiometer track until the desired voltage is achieved. The laser beam moves along through each section of the track and the procedure advantageously provides reproducible results therefor, instantaneously.

1 Claim, 3 Drawing Figures